March 19, 1935.  O. L. STARR  1,994,836
TRACTOR
Filed Dec. 6, 1932   7 Sheets-Sheet 1

Fig. 1.

INVENTOR.
Oscar L. Starr
BY
ATTORNEY.

March 19, 1935.  O. L. STARR  1,994,836
TRACTOR
Filed Dec. 6, 1932    7 Sheets-Sheet 4

Fig. 4.

INVENTOR.
Oscar L. Starr
BY
ATTORNEY.

March 19, 1935.                O. L. STARR                1,994,836
                                 TRACTOR
                   Filed Dec. 6, 1932        7 Sheets-Sheet 6

INVENTOR.
Oscar L. Starr
BY
ATTORNEY.

Patented Mar. 19, 1935

1,994,836

UNITED STATES PATENT OFFICE 1,994,836

TRACTOR

Oscar L. Starr, Mission San Jose, Calif., assignor to Caterpillar Tractor Co., San Leandro, Calif., a corporation of California Application December 6, 1932, Serial No. 645,955

7 Claims. (Cl. 184—7)

Tractors of the track type comprise briefly a power plant supported on a pair of endless track mechanisms. Each of these mechanisms has a frame usually pivoted to the power plant or main frame of the tractor adjacent its rear end and a series of rollers is mounted on each of these frames, the rollers resting and running upon the portion of the endless track which is lying upon the ground. Suitable means is interposed between the front end of the tractor and the track roller frames to transmit weight and to permit oscillation of the frames about their pivots.

Practically all of the weight is carried upon the rollers so that it is very important that their bearings be properly lubricated. Furthermore, these rollers are operated very close to the gound and are constantly operating in dust and mud, so that lubrication of the bearings of the rollers must be adequate at all times. In addition, there are other bearings in the track roller assemblies such as the bearing of the idler wheel and the bearings of the track guide rollers which require ample lubrication.

Statement of invention

It is the purpose of this invention to provide a system of lubrication for the bearings of the track rollers and other parts in the track roller assemblies of a track-type tractor or vehicle.

Another object is to provide a system of lubrication for the parts of the track roller assembly of a track-type tractor in which the track roller frame has movement relatively to the main frame or power plant of the tractor.

Another object of the invention is to provide a system of lubrication for parts of the track roller frame assembly of a track-type tractor in which the parts are simultaneously supplied with lubricant.

Another object of the invention is to provide a system of lubrication for parts of the track roller frame assembly of a track-type tractor in which the parts are automatically supplied with lubricant.

Another object of the invention is to provide a system of lubrication for parts of the track roller frame assembly of a track-type tractor in which the system is power operated but can be operated manually.

Another object of the invention is to provide a system of lubrication for parts of the track roller frame assembly of a track-type tractor in which the system is power operated and includes hydraulic means for transmitting power to mechanism located on the track roller frames.

Another object of the invention is to provide a system of lubrication for parts of the track roller frame assembly of a track-type tractor in which a separate reservoir of lubricant is provided for each track roller frame assembly.

Another object of the invention is to provide a system of lubrication for parts of the track roller frame assembly of a track-type tractor in which each part to be lubricated has separate connections to an individual pump.

Another object of the invention is to provide a system of lubrication for parts of the track roller frame assembly of a track-type tractor in which a plurality of pumps is operated by a single operating member.

Another object of the invention is to provide a system of lubrication for parts of the track roller frame assembly of a track-type tractor in which a plurality of pumps is arranged in a compact unit.

Another object of the invention is to provide a system of lubrication for parts of the track roller frame assembly of a track-type tractor in which a plurality of pumps and their operating mechanisms is contained within the reservoir of lubricant for the pumps.

Another object of the invention is to provide a system of lubrication for parts of the track roller frame assembly of a track-type tractor in which pumps for supplying lubricant to the parts to be lubricated are operated from the power plant of the tractor.

Another object of the invention is to provide a system of lubrication for parts of the track roller frame assembly of a track-type tractor in which there is a device for proportioning the supply of lubricant for each part to the travel of the vehicle.

Another object of the invention is to provide a system of lubrication for parts of the track roller frame assembly of a track-type tractor in which there is a timing device for controlling the action of the pump.

Another object of the invention is to provide a system of lubrication for parts of the track roller frame assembly of a track-type tractor in which the speed of operation of the driving mechanism of the system of lubrication is always proportional to the speed of the track driving sprocket.

Another object of the invention is to provide a system of lubrication for parts of the track roller frame assembly of a track-type tractor in which the driving mechanism of the lubricating system is connected to the transmission of the tractor.

Another object of the invention is to provide a system of lubrication for parts of the track roller frame assembly of a track-type tractor in which the driving mechanism of the lubricating system is operated by the odometer drive of the tractor.

Another object of the invention is to provide a system of lubrication for parts of the track roller frame assembly of a track-type tractor in which the mechanism of the lubricating system is embodied in units which can be readily attached to standard track-type tractors.

Another object of the invention is to provide a system of lubrication for parts of the track roller frame assembly of a track-type tractor in which the mechanism of the system is contained in three units; one unit containing the driving and timing mechanism for the system mounted on the power plant of the tractor, and two other similar units one mounted on each track roller frame each unit containing the pumps and pump operating mechanisms.

DESCRIPTION OF MECHANISM

General arrangement (Figs. 1 to 4)

Figure 1:
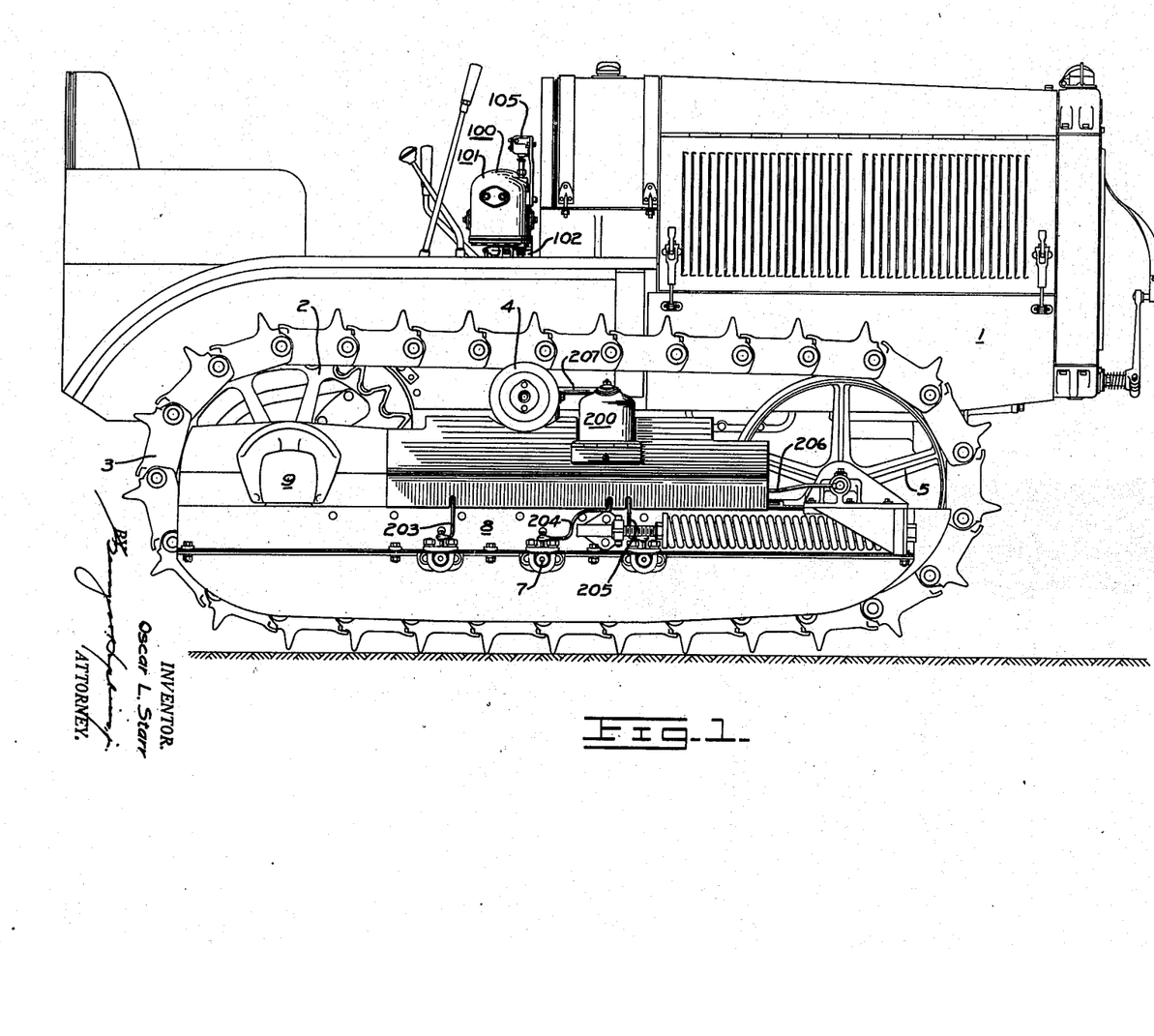
Fig. 1 is a side elevation of a tractor in which the invention has been embodied.
Figure 2:
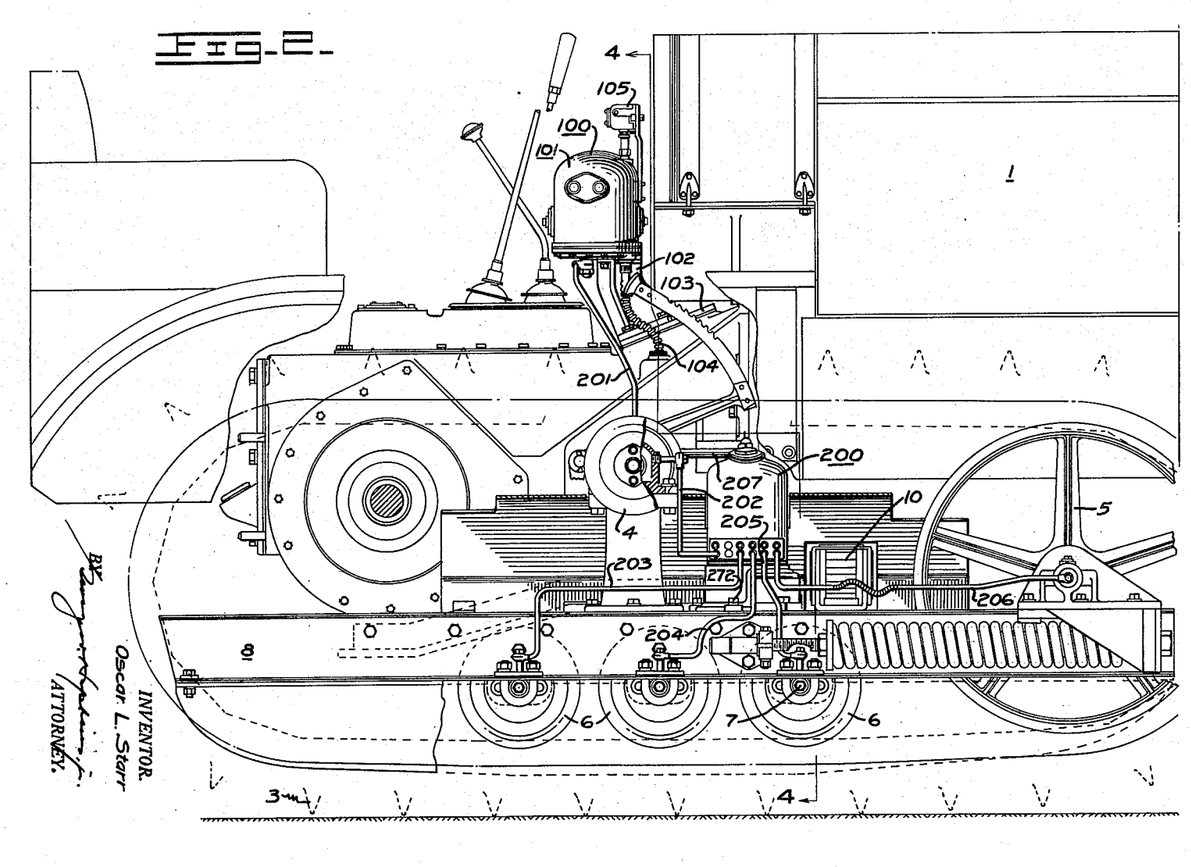
Fig. 2 is a view similar to Fig. 1 with parts broken away to better disclose the lubricating system.

The invention has been disclosed as embodied in a track-type tractor having a suitable power plant 1 (Fig. 1) for operating the endless track mechanism by means of a driving sprocket 2 engaging with a flexible endless track 3 which is guided upon a guide roller 4 and an idler wheel 5, and is laid upon the ground for the machine to roll upon. For this purpose the machine is provided with a plurality of track rollers 6 (Fig. 2) journaled upon stub shafts 7 which are secured to each track roller frame 8 of which there are two, one on each side of the machine. Each of these track roller frames 8 is pivotally mounted adjacent its rear end at 9 (Fig. 1); the axis of the pivot 9 being coincident with the axis of the sprocket 2. The forward ends of the track roller frame 8 are interconnected by an equalizer spring 10 (Fig. 2). It will be understood that the track roller frames together with the track rollers, guide rollers, and idlers are independently movable with respect to each other and with respect to the power plant 1.

Figure 3:
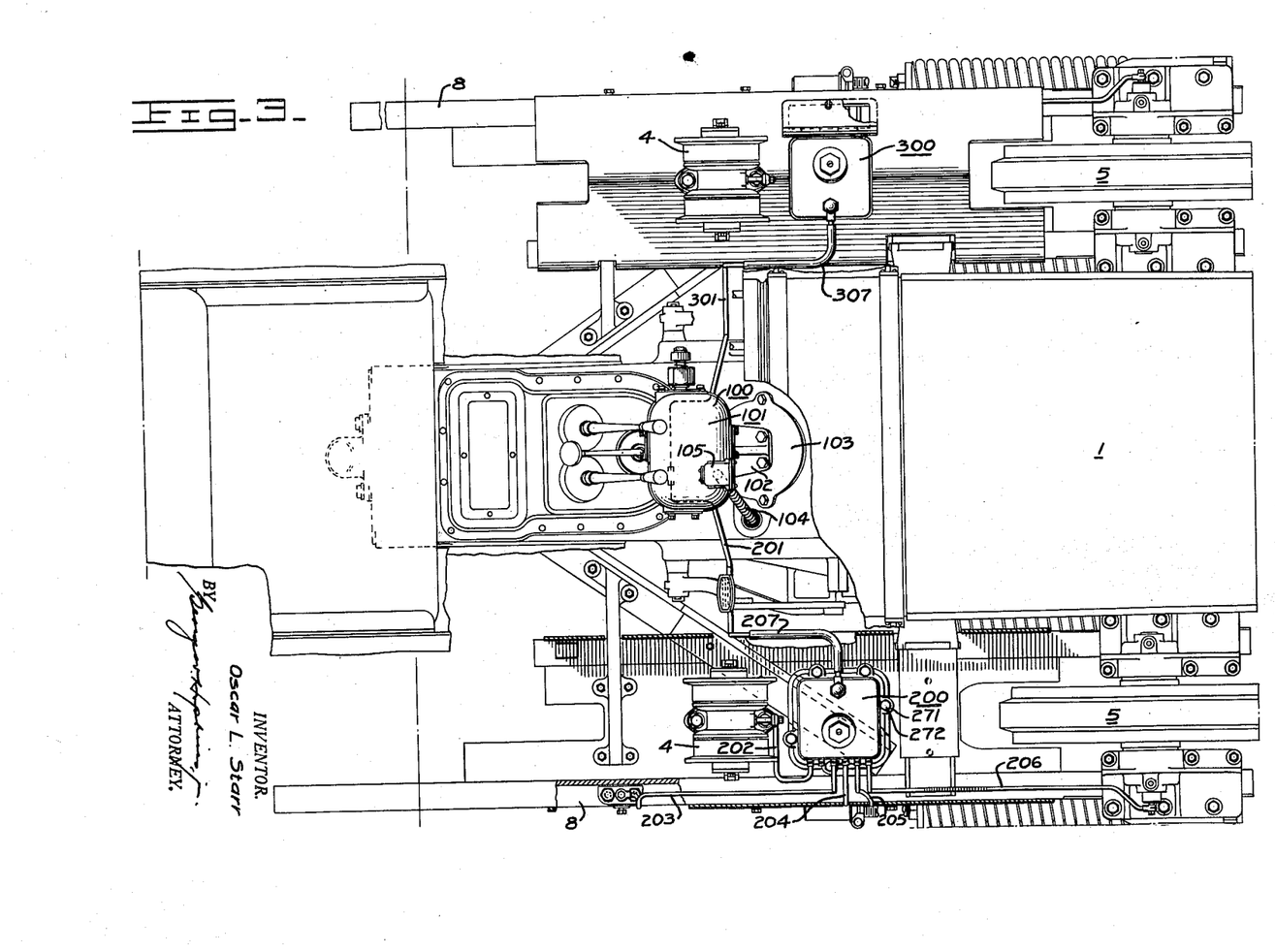
Fig. 3 is a plan view of the tractor with parts broken away to disclose the lubricating system.
Figure 4:
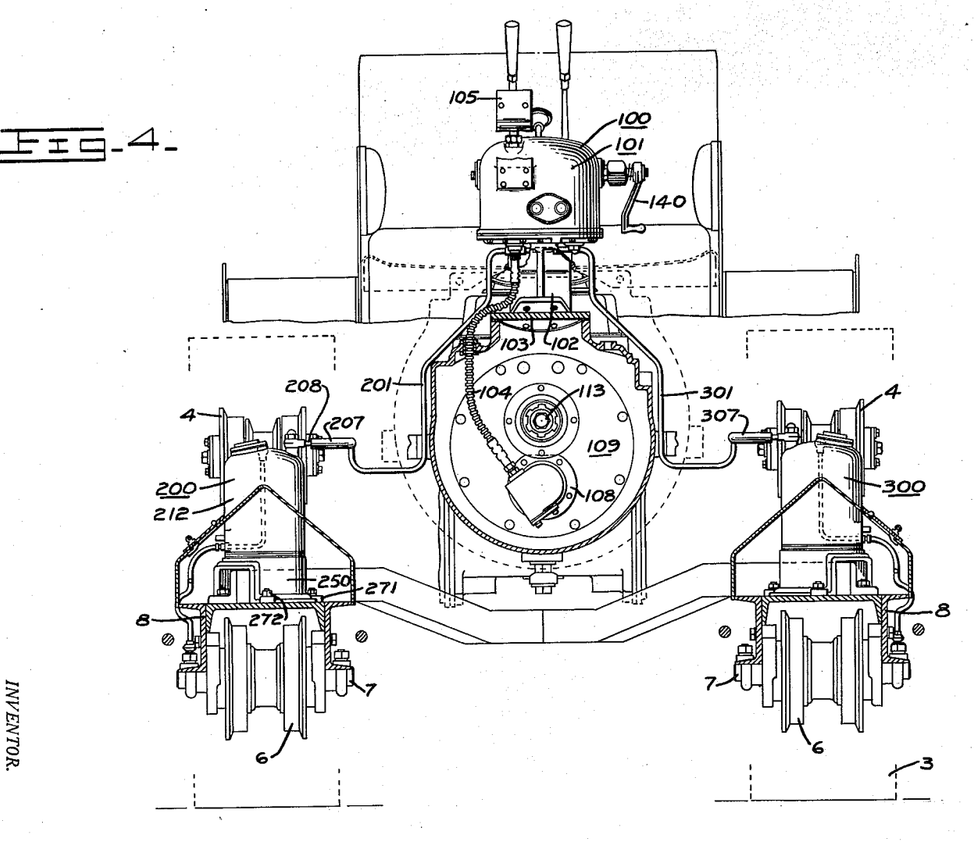
Fig. 4 is a vertical transverse section taken on the line 4—4 of Fig. 2.
Figures 5, 6:
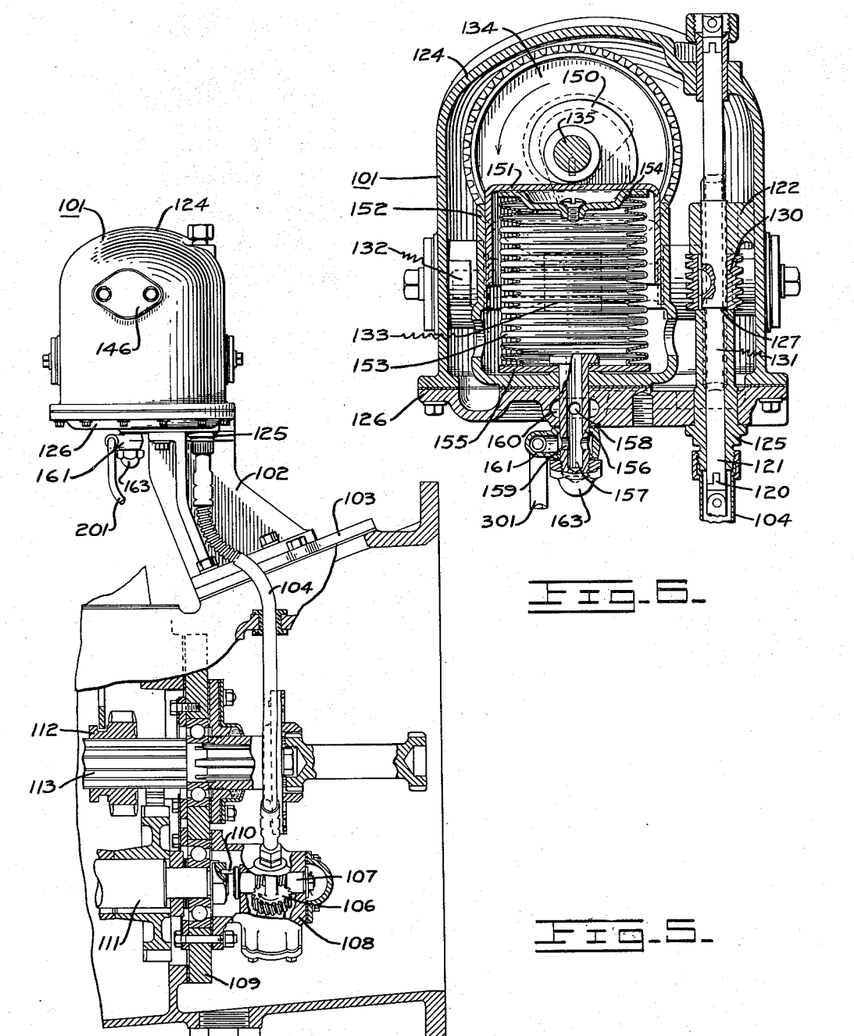
Fig. 5 is a fragmentary view to disclose the manner in which the driving mechanism of the lubricating system is operated from the transmission of the tractor.
Fig. 6 is a vertical section through the driving mechanism of the lubricating system. The section being taken on line 6—6 of Fig. 7.
Figure 7:
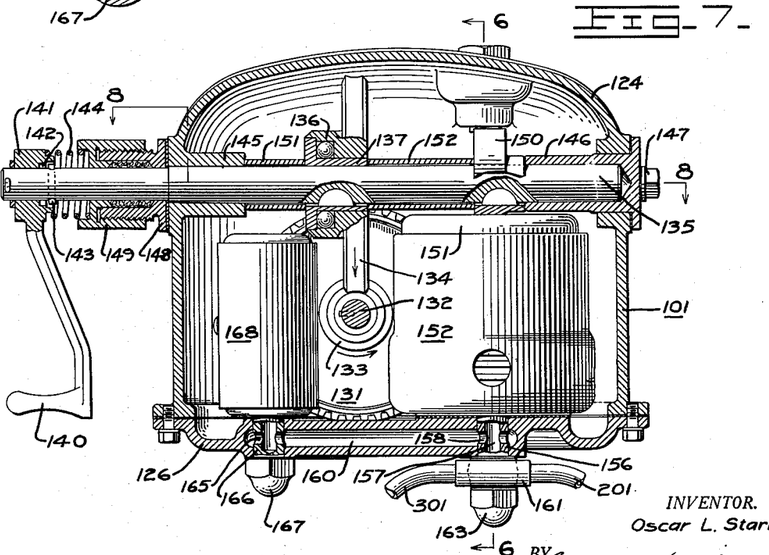
Fig. 7 is a section whose plane is normal to the plane of Fig. 6 in which certain of the internal mechanisms are shown in elevation.

The driving mechanism of the lubricating system is indicated generally at 100. Figs. 2 to 4 indicate that driving mechanism 100 contained within a housing 101 is supported on bracket 102 attached to cover plate 103 of the usual clutch housing of the transmission case. This arrangement permits ready installation of the driving mechanism. The tractor in which the invention is shown as embodied is provided with an odometer drive 104 which is employed for operating the driving mechanism of the lubricating system. The odometer 105 is mounted upon the housing 101. The driving mechanism 100 serves to operate pumping devices 200, 300 (Fig. 4), one mounted on each track roller frame. Each of these pumping devices has a pipe connection 201, 301 with the driving mechanism 100. As these pumping devices are similar, only one will be described in detail.

As shown in Fig. 2, the device 200 has a plurality of outlets from which a series of pipes 202, 203, 204, 205, 206 lead to the bearings of guide roller 4, track rollers 6, and idler wheel 5. Each of the pipe connections 201, 301 (Fig. 4) includes a section of rubber hose 207, 307 which permits movement of the track roller frame assemblies relatively to the power plant or main frame of the machine. The driving mechanism of the lubricating system will now be explained in detail.

Driving mechanism of the lubricating system (Figs. 5 to 9)

The odometer drive 104 (Fig. 5) comprises a flexible shaft within a cable, the lower end of the shaft being connected to pinion 106 (Fig. 5) driven from stub shaft 107 journaled in bracket 108 adapted to be attached to front cover plate 109 of the transmission of the tractor. Shaft 107 has crank pin 110 engaging in an aperture in the front end of lower transmission shaft 111 which is operated in the usual manner by means of selectively slidable gears 112 on upper transmission shaft 113 which is driven from the power plant by means of a main clutch not shown, but which is located coaxially with shaft 113 and beneath cover plate 103.

The upper end of the flexible shaft (Fig. 6) of odometer drive 104 is connected at 120 to the lower end of vertical drive shaft 121 which is journaled in a bearing 122 formed integrally with the top 124 of the housing 101 and in a sleeve 125 mounted in the bottom 126 of housing 101. The portion of shaft 121 above sleeve 125 is of increased diameter so that a shoulder is formed at 127 which abuts the upper end of sleeve 125 to maintain shaft 121 in proper axial position. Upon this enlarged portion of shaft 121 and between bearing 122 and sleeve 125 is keyed a worm 130.

Worm 130 (Fig. 8) drives worm wheel 131 secured to longitudinal horizontal shaft 132 which has worm 133 (Fig. 7) secured thereon to drive worm wheel 134 on transverse horizontal shaft 135. Worm wheel 134 is not directly connected to shaft 135, but is adapted to be connected by a one-way ball clutch 136 to sleeve 137 which is keyed to shaft 135. Clutch 136 prevents reverse operation of shaft 135 and is provided so that shaft 135 can be operated not only by means of worm wheel 134 but also by means of a hand crank 140, the hub 141 of which is provided with a slot 142 which can be engaged with a pin 143 in shaft 135 to rotate the shaft by means of the crank 140. The crank 140 is normally inoperative by being pressed out of engagement with pin 143 by spring 144.

Figures 8, 9:
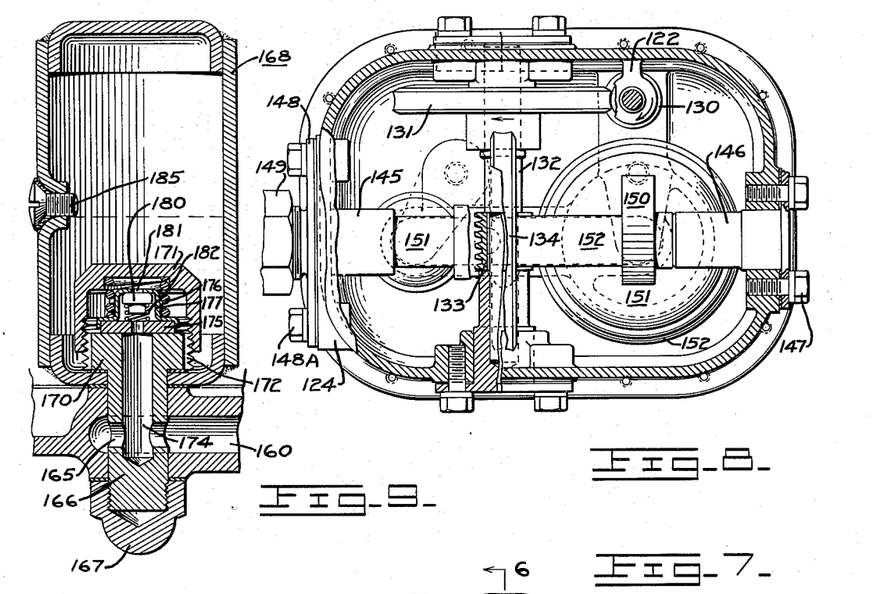
Fig. 8 is a horizontal section on line 8—8 of Fig. 7 disclosing the internal mechanism in plan.
Fig. 9 is a vertical section through the expansion chamber shown in Fig. 7.

Shaft 135 is journaled in boss 145 formed in the top 124 of housing 101 and in removable sleeve 146 attached to housing 101 by screws 147. The crank end of shaft 135 is of reduced diameter and has a shoulder abutting retainer sleeve 148 which is attached to the housing by screws 148A (Fig. 8). Retainer sleeve 148 (Fig. 7) is provided with a stuffing box 149 which has a recess in its crank side to form a seat for spring 144.

A cam 150 is keyed to shaft 135. Sleeves 151, 152 serve to maintain sleeve 137 and cam 150 in their proper axial positions on shaft 135. It is thought to be evident from the description so far that the cam 150 can be rotated either by means of the power-operated drive which consists of the odometer drive and the train of driving gears in the housing 101 or the cam can be actuated manually by means of the crank 140. It is also apparent that the driving gear ratios may be selected to obtain any desired ratio of speed between shaft 135 and lower transmission shaft 111, or track driving sprocket 2 which is geared to transmission shaft 111, depending upon the frequency with which lubricant is to be pumped into the bearings of the track roller mechanism.

Cam 150 (Fig. 6) operates against the closed top of sleeve 151 which is guided for vertical sliding movement in barrel 152. Between the top of sleeve 151 and the bottom of barrel 152 there extends a flexible metal bellows 153, the ends of which are closed by plates 154, 155. Plate 155 and the bottom of barrel 152 have aligned apertures through which a bolt 156 passes. The bolt 156 has a passage 157 extending axially therethrough and opening through the head of bolt 156 into the interior of bellows 153. The lower end of passageway 157 is closed. Transverse passages 158, 159 intersect passage 157. Passage 158 communicates with passage 160 formed in bottom 126 of housing 101, and passage 159 communicates with the interior of pipe connection 161. Bottom plate 155 of the bellows and the barrel 152 and pipe connector 161 are clamped to the bottom 126 of housing 101 by means of bolt 156 and nut 163 threaded on its lower end, suitable gaskets being interposed between the various contacting surfaces.

Passage 160 (Fig. 7) communicates with passage 165 in bolt 166 which by means of nut 167 clamps expansion chamber 168 on bottom 126 of housing 101 in substantially the same manner as parts just described are clamped by bolt 156 and its nut 163, as will appear from an inspection of Fig. 9. The head 170 of bolt 166 has external threads for a threaded cap 171. Spaced vertical slots 172 are provided in the threaded surface of the bolt head to provide vertical passageways between the interior of chamber 168 and the interior of cap 171. Bolt 166 has an axial passage 174 which intersects passage 165 and which opens through the head of the bolt.

The top surface of the bolt head 170 is plane to provide a seat for valve 175 which is retained on its seat by means of spring 176 seating at its upper end in a recess in cap 171 and guided at its lower end by a cup 177, the lower end of which fits over valve 175. The cup serves as a seat for valve 180 which controls port 181 in cup 177. Valve 180 is pressed against its seat by means of spring 182. Valve 175 is apertured at its center to establish communication between passage 174 and the interior of cup 177.

Connector 161 (Fig. 7) is attached to pipes 201, 301 which have been previously described as leading to the pumping devices on the lower track roller frames.

The telescopic movement of sleeve 151 (Fig. 6) in barrel 152, caused by operation of cam 150, results in alternate collapsing and extending of bellows 153. Bellows 153 and the various passageways which have been described as communicating therewith, including the pipes 201, 301, are filled with a fluid, such as a suitable solution of glycerine and alcohol, like that commonly employed in hydraulic brake systems. Bellows 153 forms the driving or operating unit of the hydraulic operating means. It will be readily seen that the fluid pressures in the pipes 201, 301 will rise and fall in accordance with the operation of bellows 153.

The fluid is introduced into expansion chamber 168 (Fig. 9) by removing screw 185 and filling the chamber to the level of the broken line. The valve mechanism within the expansion chamber 168 serves to automatically maintain the hydraulic operating system filled with fluid at all times and under all operating conditions. At a predetermined maximum pressure in the system, valve 175 opens to permit escape of fluid from the system into the expansion chamber 168 through slots 172. Thus, valve 175 serves not only to permit expansion of the fluid in the system due to temperature increases, but also serves as a safety valve to protect the system from breakage by excessive pressures resulting from clogging of the passages. Valve 180 serves to supply any deficiency of fluid in the system resulting from contraction of the fluid on temperature decrease, a slight vacuum being created in the system which causes valve 180 to open and admit fluid through port 181.

*Pumping mechanism (Figs. 10 to 14)*

As previously stated, the pumping mechanisms 200, 300 are similar, one being located on each track roller frame. One of these devices will now be described. Rubber hose 207 (Fig. 4) is connected to the short pipe 208 (Fig. 10) which is attached to a connector 209 communicating with a hollow bolt 210 mounted in a boss 211 in a chamber 212. A nut 213 is threaded on bolt 210 and clamps connector 209 in place. One end of a coil of tubing 214 is inserted in the lower end of bolt 210 to establish communication through the passage in the bolt to the pipe 208. The other end of the coil of tubing 214 is inserted in a similar pipe connector 215 attached to bolt 216 by nut 217. Bolt 216 has a passage 218 communicating with tubing 214 and a passage 219 communicating with passage 218. Passage 219 extends axially of the bolt throughout substantially the upper half of its length. The lower end of passage 219 intersects passage 220 which communicates with the interior of a bellows 225, the ends of which are closed by plates 226, 227, plate 226 being clamped against the top 228 of a housing 230 by means of bolt 216 and nut 217. The upward movement of bottom plate 227 of bellows 225 is limited by the lower end of bolt 216 which acts as a stop. The bellows mechanism just described constitutes the driven part of the hydraulic operating mechanism and serves to actuate the pumps. It will be understood that plate 227 at the bottom of bellows 225 will reciprocate substantially in synchronism with the reciprocation of sleeve 151 (Fig. 6), in accordance with the operation of cam 150.

Figures 10, 11, 12, 13, 14:
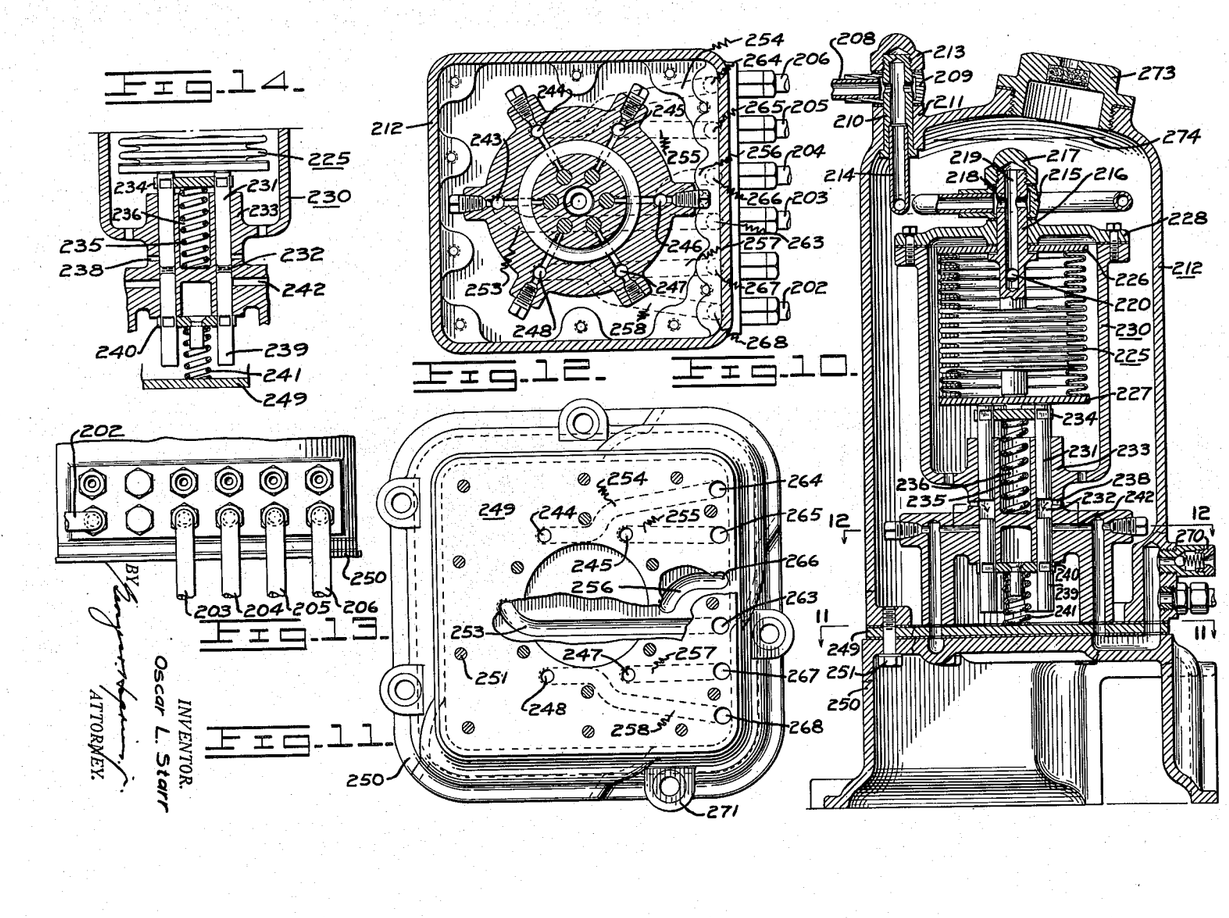
Fig. 10 is a vertical section through one of the pump units.
Fig. 11 is a horizontal section taken on line 11—11 of Fig. 10.
Fig. 12 is a horizontal section taken on line 12—12 of Fig. 10.
Fig. 13 is a detail of the connections.
Fig. 14 is a fragmentary view of the pumps in operation.

A plurality of plungers 231 are arranged to reciprocate in vertical bores 232 in a body 233 formed integrally with housing 230. These plungers and bores are arranged in a circle about the axis of the body which is substantially coincident with the axis of bellows 225 (Fig. 12). A plurality of bores 232 is provided and they are equally spaced circumferentially. Plungers 231 are situated in the upper ends of bores 232 and are secured together by a member 234 for simultaneous axial movement. The upper ends of plungers 231 are coplanar and contact the under surface of bottom plate 227 of bellows 225. A spring 235 located in a recess 236 in body 233 engages the under side of member 234 to urge plungers 231 upwardly. Plungers 231 are moved downwardly by plate 227 on bellows 225 and are returned by spring 235. Spring 235 not only returns plate 227 upwardly, but through the action of the fluid causes sleeve 151 (Fig. 6) to be maintained in contact with cam 150. Adjacent the lower end of each plunger there is a port 238 which admits lubricant contained in housing 212 to bore 232, each port 238 constituting an inlet port for its pump. In the lower ends of bores 232 are a plurality of plungers 239 similar to plungers 231 which are secured together for simultaneous axial movement by member 240 which is urged upwardly by spring 241 against the lower end of body 233 as a stop. Downward movement of plungers 231 causes compression of the lubricant in bore 232 after inlet port 238 is covered by plungers 231, as shown in Fig. 14. Further downward movement of plungers 231 causes downward movement of plungers 239 against the action of spring 241 until plungers 239 uncover ports 242 through which the compressed lubricant is discharged. The discharge ports 242 communicate with a series of vertical passages 243, 244, 245, 246, 247, 248 (Fig. 12) in a cylindrical pedestal attached to body 233 and formed as an integral part of housing 230.

Housings 212, 230 rest on a spacer 249 which is provided with apertures which align with the vertical passages 243, 244, 245, 246, 247, 248 and which constitute extensions of the same. These apertures also communicate with grooves in the top of base 250 on which spacer 249 rests and to which the housings are fastened by means of screws 251. When the parts are assembled, the spacer 249 covers the grooves, except where the spacer 249 is apertured, to provide a series of horizontal passages 253, 254, 255, 256, 257, 258 (Fig. 11) communicating at one end with vertical passages 243, 244, 245, 246, 247, 248, respectively. The opposite ends of these horizontal passages communicate with apertures in spacer 249 which are aligned with and communicate, respectively, with vertical passages 263, 264, 265, 266, 267, 268. The last-named vertical passages are equally spaced along one side of housing 212. Each of these vertical passages is adapted to be provided with a pipe connection and a relief valve. Vertical passage 268 is connected to pipe 202. Vertical passage 263 connects with pipe 203. Vertical passage 266 connects with pipe 204. Vertical passage 265 connects with pipe 205. Vertical passage 264 connects with pipe 206. Above each of the last-named pipe connections a relief valve 270 (Fig. 10) is located in the end of the vertical passage and upon opening of the valve permits lubricant to escape to the atmosphere.

In the present embodiment each unit contains six pumps and connections are made to five bearings so that there is no pipe connection or relief valve in vertical passage 267. The unconnected pump provides means whereby additional mechanism, such as a bearing for auxiliary equipment, can be connected for lubrication when so desired. Obviously, the unit could be made with any desired number of pumps. The lower edge of base 250 is flanged and provided with apertured bosses 271 for mounting on track roller frame 8 (Fig. 2) by means of screws 272. The housing 212 serves as a reservoir for lubricant and is filled by removing plug 273. The reservoir is filled to the level indicated by line 274, so that all of the mechanism in the housing 212 is immersed in the lubricant and the lubricant can enter housing 230 through the apertures adjacent the body 233. However, the lubricant cannot enter the bellows 225 nor the piping connected thereto. The bellows forms a part of the hydraulic operating system which, as previously described, is filled with a special fluid.

The reason for employing a special fluid in the hydraulic operating system is that it is necessary to employ flexible tubing 207, 307 (Fig. 4) and which necessitates the use of a fluid which will not have a deleterious effect on the rubber, whereas lubricating oil would cause rapid deterioration of the rubber tubing and would be impractical.

Each bearing has its own pump and each pump is connected to the bearing which it supplies by separate conduit. In addition, each of the conduits is equipped with a relief valve. By this arrangement more efficient lubrication of the bearings is obtained, because failure of a pump, or failure of its conduit to transmit the lubricant from the pump to the bearing, does not in any way affect the operation of any of the other pumps, or the lubrication of any of the other bearings. If, for any reason, the lubricant cannot be pumped through one of the pipes to its bearing, the associated relief valve will open and discharge lubricant, thereby serving not only as a safety device but as an indication of trouble.

I, therefore, claim as my invention:

1. The combination with a tractor, having a power plant, supported on a pair of endless track devices, each comprising an endless track, a series of rollers to support the weight of said power plant upon the ground run of said track, and a frame in which said rollers are mounted, said frame being movable with respect to said power plant, of a lubricating system for the bearings of said rollers, comprising a unit attached to said power plant and adapted to be driven thereby, comprising a housing, speed changing and power transmitting gearing mounted in said housing, and the prime mover of a hydraulic transmitting system mounted in said housing and actuated by said gearing, a second unit attachable to one track roller frame, a third unit attachable to the other of said track roller frames, each of said second and third units comprising a housing, an actuated element of the hydraulic transmitting system located therein, and a pump in said housing and operated by said hydraulically actuated element for supplying lubricant to the bearings.

2. The combination with a tractor, having a power plant, including a transmission, and a pair of track driving sprockets operated thereby, supported on a pair of endless track devices, each comprising an endless track engaging with said track driving sprocket, a series of rollers to support the weight of said power plant upon the ground run of said track, a frame in which said rollers are mounted, said frame being movable with respect to said power plant, of a lubricating system for the bearings of said rollers, comprising a unit mounted on said power plant and geared to said transmission, having a driving shaft, a cam operable with said shaft, and a bellows operable by said cam, a pair of other units, one on each track roller frame, each comprising a bellows, a plurality of pumps actuated by said bellows, a plurality of pipe connections on said unit, a separate conduit from each pump to each connection, a separate conduit from each of said connections to each of the bearings of the rollers mounted on the frame on which the unit is mounted, and a conduit connecting the bellows in each of said pair of other units to the bellows in said first unit.

3. The combination with a tractor, having a power plant, including a transmission, and a pair of track driving sprockets operated thereby, supported on a pair of endless track devices, each comprising an endless track engaging with said track driving sprockets, a series of rollers to support the weight of said power plant upon the ground run of said track, a frame in which said rollers are mounted, said frame being movable with respect to said power plant, of a lubricating system for the bearings of said rollers, comprising a unit mounted on said power plant and geared to said transmission, having a driving shaft, and a cam operable with said shaft, a bellows of a hydraulic system operable by said cam, a pair of other units, one on each track roller frame, each comprising a bellows of said hydraulic system, a plurality of pumps actuated by said bellows, a plurality of pipe connections on said unit, a separate conduit on each pump to each connection, a separate conduit from each of said connections to each of the bearings of the rollers mounted on the frame on which the unit is mounted, and a conduit connecting the bellows in each of said pair of other units to the bellows in said first unit.

4. The combination with a tractor having a power plant supported on a pair of endless track devices, each comprising an endless track, a series of rollers to support the weight of said power plant upon the ground run of said track, and a frame on which said rollers are mounted, said frame being movable with respect to said power plant, of a lubricating system for the bearings of said rollers, comprising a unit attached to said power plant and adapted to be driven thereby, comprising a housing having driving mechanism mounted therein, and the prime mover of a hydraulic transmitting system mounted in said housing and actuated by said driving mechanism, a second unit attachable to one track roller frame, a third unit attachable to the other of said track roller frames, each of said second and third units comprising a housing, actuated means of the hydraulic transmitting system located therein, pump means in said housing and operated by said hydraulic actuated means for supplying lubricant to said bearings, and a conduit connecting the hydraulic prime mover of said unit attached to the power plant with the hydraulic actuated means of the unit on each track frame.

5. The combination with a tractor having a power plant supported on a pair of endless track devices, each comprising an endless track, a series of rollers to support the weight of said power plant upon the ground run of said track, and a frame on which said rollers are mounted, said frame being movable with respect to said power plant, of a lubricating system for the bearings of said rollers, comprising a unit attached to said power plant and adapted to be driven thereby, comprising a housing having driving mechanism mounted therein, and the prime mover of a hydraulic transmitting system mounted in said housing and actuated by said driving mechanism, a second unit attachable to one track roller frame, a third unit attachable to the other of said track roller frames, each of said second and third units comprising actuated means of the hydraulic transmitting system, a plurality of pumps operated by said hydraulic actuated means, a plurality of pipe connections on said unit, a separate passage from each pump to each connection, a separate conduit from each of said connections to each of the bearings of the rollers mounted on the frame on which the unit is mounted, and a conduit connecting the hydraulic prime mover of said unit attached to the power plant with the hydraulic actuated means of the unit on each track frame.

6. The combination with a tractor having a power plant supported on a pair of endless track devices, each comprising an endless track, a series of rollers to support the weight of said power plant upon the ground run of said track, and a frame on which said rollers are mounted, said frame being movable with respect to said power plant, of a lubricating system for the bearings of said rollers, said system comprising a prime mover unit of a hydraulic transmitting system, said prime mover unit being mounted on and driven by said power plant, a pair of hydraulic actuated units each being mounted on a track frame and having a hydraulic connection with said prime mover unit, a housing on each track frame enclosing the hydraulic actuated unit thereon and adapted to contain lubricant, lubricant pumping means operated by each actuated unit, said lubricant pumping means including a cylinder having an aperture in a wall thereof communicating with said housing, and conduits connecting the track rollers on each frame with one of said pumping means.

7. The combination with a tractor having a power plant supported on a pair of endless track devices, each comprising an endless track, a series of rollers to support the weight of said power plant upon the ground run of said track, and a frame on which said rollers are mounted, said frame being movable with respect to said power plant, of a lubricating system for the bearings of said rollers, said system comprising a prime mover unit of a hydraulic transmitting system, a hydraulic actuated unit having a hydraulic connection with said prime mover unit, a housing enclosing the hydraulic actuated unit and adapted to contain lubricant, lubricant pumping means operated by said actuated unit, said lubricant pumping means including a cylinder having an aperture in a wall thereof communicating with said housing, and conduits connecting track rollers with said pumping means.

OSCAR L. STARR.